(12) United States Patent
Ji et al.

(10) Patent No.: US 8,315,390 B2
(45) Date of Patent: Nov. 20, 2012

(54) METHOD FOR ADMISSION CONTROL OF MULTIPLE SERVICE FLOWS PAGING IN MOBILE PACKET DOMAIN

(75) Inventors: Chong Ji, Shenzhen (CN); Junyi Liu, Shenzhen (CN); Donghua Chen, Shenzhen (CN); Hongyue Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 422 days.

(21) Appl. No.: 12/452,595

(22) PCT Filed: Jun. 19, 2008

(86) PCT No.: PCT/CN2008/071352
§ 371 (c)(1),
(2), (4) Date: Jan. 8, 2010

(87) PCT Pub. No.: WO2009/009980
PCT Pub. Date: Jan. 22, 2009

(65) Prior Publication Data
US 2010/0122322 A1    May 13, 2010

(30) Foreign Application Priority Data
Jul. 16, 2007   (CN) .......................... 2007 1 0130557

(51) Int. Cl.
| | |
|---|---|
| H04K 1/00 | (2006.01) |
| G06F 7/04 | (2006.01) |
| G06F 15/16 | (2006.01) |
| G06F 17/30 | (2006.01) |
| G06F 11/00 | (2006.01) |
| H04L 29/06 | (2006.01) |
| H04L 1/00 | (2006.01) |
| H04L 12/26 | (2006.01) |
| G01R 31/08 | (2006.01) |
| G08C 15/00 | (2006.01) |
| H04J 1/16 | (2006.01) |
| H04J 3/14 | (2006.01) |

(52) U.S. Cl. ............. 380/271; 726/4; 370/228; 370/229
(58) Field of Classification Search ....... 726/4; 380/271
See application file for complete search history.

(56) References Cited

U.S. PATENT DOCUMENTS 6,477,382 B1 * 11/2002 Mansfield et al. ............ 455/458
6,480,476 B1 * 11/2002 Willars ........................ 370/311
(Continued)

FOREIGN PATENT DOCUMENTS
CN    1848854 A    10/2006
(Continued)

Primary Examiner — Nathan Flynn
Assistant Examiner — Carolyn B Kosowski
(74) Attorney, Agent, or Firm — Farjami & Farjami LLP

(57) ABSTRACT

A method for paging admission control for multi-service flows in a mobile packet domain is provided and comprises steps of when authentication of a mobile station accessing a connectivity service network through an access service network succeeds, assigning a service flow paging strategy for a downlink service flow of the mobile station, and sending the service flow paging strategy to the access service network; receiving, by the access service network, downlink data of a mobile station in IDLE state from a home agent, searching for a downlink service flow to which the downlink data belong, and judging whether the service flow admits paging according to the service flow paging strategy, and if yes, initiating a paging flow triggered by the downlink data.

11 Claims, 3 Drawing Sheets

U.S. PATENT DOCUMENTS

| | | | |
|---|---|---|---|
| 7,142,520 B1 * | 11/2006 | Haverinen et al. | 370/311 |
| 7,283,496 B2 * | 10/2007 | Gurivireddy et al. | 370/331 |
| 7,474,900 B2 * | 1/2009 | Rossetti | 455/458 |
| 7,573,842 B2 * | 8/2009 | Xie et al. | 370/311 |
| 7,978,638 B2 * | 7/2011 | Kim et al. | 370/311 |
| 8,150,317 B2 * | 4/2012 | Suh et al. | 455/41.2 |
| 8,200,254 B2 * | 6/2012 | Wang et al. | 455/458 |
| 2005/0272481 A1 * | 12/2005 | Kim | 455/574 |
| 2007/0077946 A1 * | 4/2007 | Benco et al. | 455/458 |
| 2008/0259889 A1 * | 10/2008 | Wu | 370/338 |
| 2009/0055504 A1 * | 2/2009 | Xie et al. | 709/207 |
| 2010/0081454 A1 * | 4/2010 | Wang et al. | 455/456.1 |

FOREIGN PATENT DOCUMENTS

| | | |
|---|---|---|
| CN | 1997003 A | 7/2007 |
| WO | WO2006016766 A2 | 2/2006 |

* cited by examiner

| 0 | 8 | 16 | 24 |
|---|---|---|---|
| TYPE = TBD | | Length = 2 | |
| Paging Admission Indicator | | 0x0000/0x0001 | |

METHOD FOR ADMISSION CONTROL OF MULTIPLE SERVICE FLOWS PAGING IN MOBILE PACKET DOMAIN

This is a U.S. national phase application which is based on, and claims priority from, PCT application Serial No. PCT/CN2008/071352, filed Jun. 19, 2008, which claims priority from foreign application Serial No. 200710130557.7, filed Jul. 16, 2007 in China.

TECHNICAL FIELD

The present invention relates to mobile communication field, and in particular, to a method for paging admission control for multi-service flows in a mobile packet domain.

BACKGROUND OF THE INVENTION

The basic structure of a WIMAX (Worldwide Interoperability for Microwave Access) network is shown in FIG. 1, in which each logical entity represents a group of functional entities, and each function can be implemented in a single physical device or a plurality of distributed physical devices.

An ASN (Access Service Network) belongs to an NAP (Network Access provider) and comprises:

an FA (Foreign Agent), which is a mobile IP;

a BS (Base Station), which is situated within the ASN;

an AGW (ASN Gateway), which is an edge device between the ASN and a CSN (Connectivity Service Network);

a PC (Paging Controller), which is in charge of initiating paging or controlling an MS (Mobile Station) entering IDLE;

an LR (Location Register), which is in charge of storing information about an IDLE MS;

a DPF (Data Path Function), which is in charge of managing establishment, maintenance and deletion of a service flow path; and an SFA (Service Flow Authorization), which is in charge of initiating a resource reservation request and maintaining a service flow's parameters such as QoS (Quality of Service), classifier and so on.

An H-NSP (Home Network Service Provider) is in charge of authentication of an MS, authorization of a service, and management of IP host configuration, etc. The authentication function is performed between an MS and a CSN of the H-NSP. In a roaming mode, an ASN and a CSN of a V-NSP (Visit Network Service Provider) may also process part of the authentication flow and mechanism.

An AAA (Authentication/Authorization/Accounting) server is situated in the H-NSP or a CSN of the V-NSP.

In a Wimax network, a plurality of service flows can be established between an MS terminal and each ASN, and each of the service flows can have a different QoS, direction, classifier, and so on. The service carried on each of the service flows may also be different, for example, a user generates an uplink service flow (SFID (Service Flow Identification)=1) and two downlink service flows (SFID=2 and SFID=3), wherein the uplink service flow can be used for an FTP (File Transfer Protocol) request, a streaming media request, etc., and the downlink service flow can be used to carry content of a download file and information of a streaming media.

In a Wimax network, an MS can enter IDLE state, in which case the BS will not store any information about the MS, but only the AGW has information of all the service flows of the MS. Moreover, when an MS is in IDLE state, downlink data can induce paging of the MS by the AGW.

The current paging mechanism has some defects because downlink service flows of each MS may also include a downlink initial service flow without a classifier in addition to service flows with definite service types. When a user of an exterior network scans a network segment of users in an ASN, for example, a special message is constructed and sent to all the IP addresses in the network segment of the users, and an HA (Home Agent) will forward these downlink data to the AGW; if many MSs in the access network are in IDLE state, for each MS in IDLE state, if the MS has a downlink service flow of the same type as the received downlink data, the PC will initiate paging of the MS; if the MS does not have a downlink service flow of the same type as the received downlink data, the AGW will consider by default that the MS has an downlink initial service flow that can be used for the message to initiate paging, so the PC will also initiate paging of the MS, and as such, the PC will initiate paging of all the MSs in IDLE state. As a result, the AGW, BS and MSs all need to initiate a series of unnecessary paging flows, which is a serious waste of resources for the operator.

SUMMARY OF THE INVENTION

The present invention provides a method for paging admission control for multi-service flows in a mobile packet domain, which can effectively avoid initiating paging of all the MSs in IDLE state after an Anchor DP receives downlink data belonging to IDLE state from an HA, and thus alleviates resource burden of the operator and users.

The technical solution adopted by the present invention is as follows: a method for paging admission control for multi-service flows in a mobile packet domain, comprising:

when authentication of a mobile station accessing a connectivity service network through an access service network succeeds, assigning a service flow paging strategy for a downlink service flow of the mobile station, and sending the service flow paging strategy to the access service network; and receiving, by the access service network, downlink data of a mobile station in IDLE state from a home agent, searching for a downlink service flow to which the downlink data belong, and judging whether the service flow admits paging according to the service flow paging strategy, and if yes, initiating a paging flow triggered by the downlink data.

Furthermore, the method specifically comprises:

when authentication of a mobile station accessing a connectivity service network through an access service network succeeds, assigning, by an authentication authorization accounting or strategy server, a service flow paging strategy for all downlink service flows of the mobile station, and sending the service flow paging strategy to the access service network for storage;

during establishment of service flows, utilizing, by an anchor service flow authorization functional entity situated in the access service network, the service flow paging strategy to obtain paging admission information of each service flow, and binding, by a serving service flow authorization functional entity, the service flow with the paging admission information thereof; and after receiving, by an anchor data path situated in the access service network, downlink data of a mobile station in IDLE state from a home agent, searching for a downlink service flow to which the downlink data belong, and judging whether the service flow admits paging according to the paging admission information, and if yes, initiating a paging flow triggered by the downlink data.

Furthermore, the service flow paging strategy adopts any one of the following approaches:

specifying a range of IP addresses in which paging is admitted; or explicitly pointing out whether each service flow admits paging or not.

Furthermore, after the access service network receives the service flow paging strategy, the service flow paging strategy is stored by the anchor service flow authorization functional entity.

Furthermore, the service flow establishment process further comprises:

A, during establishment of a service flow for the mobile station, searching, by the anchor service flow authorization functional entity, for the service flow paging strategy of the mobile station according to an identification of the service flow to obtain paging admission information of the service flow, the paging admission information indicating whether the service flow admits paging or not; and B, sending, by the anchor service flow authorization functional entity, a resource reservation request to the anchor data path to trigger a flow of establishing a service flow path, wherein the paging admission information of the service flow is carried, and binding, by the anchor data path, the service flow with the paging admission information thereof after receiving the request.

Furthermore, in the step B, a new field of Type Length Value is added in the resource reservation request, or an original definition of a Type Length Value field in the resource reservation request is amended, in order that the field is used to represent the paging admission information of the service flow.

Furthermore, in the step B, the service flow bound with the paging admission information is uniquely determined by an identification of the mobile station, to which the service flow belongs, in conjunction with the identification of the service flow.

Furthermore, in the step B, if the anchor service flow authorization functional entity and the anchor data path are deployed in one network element, the resource reservation request does not need to be transmitted between network elements, but is represented by an internal message, or sending of the resource reservation request is omitted.

Furthermore, after receiving downlink data of the mobile station in IDLE state from the home agent, the anchor data path situated in the access service network finds the service flow to which the downlink data belong through searching a classifier, and then finds the paging admission information bound with the service flow by using an identification of the mobile station, to which the service flow belongs, in conjunction with an identification of the service flow.

To sum up, the present invention provides a method for paging admission control for multi-service flows in a mobile packet domain, and since a service flow paging strategy is assigned for the downlink service flow of each MS, when an ASN receives downlink data, it searches for the service flow to which the downlink data belong, and initiates a paging flow only if the service flow admits paging, thereby avoiding initiating paging of all the MSs in IDLE state and thus alleviating resource burden of the operator and users.

PREFERRED EMBODIMENTS OF THE INVENTION

The technical solution of the present invention will be further described below with reference to the drawings and embodiments.

The present invention provides a method for paging admission control for multi-service flows in a mobile packet domain, comprising: when authentication of an MS accessing a CSN through an ASN succeeds, assigning a service flow paging strategy for a downlink service flow of the MS and sending the strategy to the ASN; receiving, by the ASN, downlink data of an MS in an idle state from a Home Agent, searching for a downlink service flow to which the downlink data belong, and judging whether the service flow admits paging according to the service flow paging strategy, if yes, initiating a paging flow triggered by the downlink data.

The present invention will be further described with reference to embodiments in three aspects: assigning a service flow paging strategy, establishing a service flow and receiving downlink data for paging.

Embodiment 1

Assigning a Service Flow Paging Strategy

Step 201: an MS accesses to a CSN in a V_NSP through an ASN, and is authenticated by an AAA in a CSN of a H_NSP. Once the authentication succeeds, a service flow paging strategy is assigned for a downlink service flow of the MS, and the service flow paging strategy of the MS is sent to the ASN; the service flow paging strategy can be assigned for the MS by the AAA or a strategy server.

If the AAA assigns the service flow paging strategy, subscription information and some strategies of the MS, including the service flow paging strategy assigned for the MS, are sent to the ASN through a Radius Access Accept message.

A service flow paging strategy may adopt, but not limited to, any one of the following approaches: specifying a range of IP addresses in which paging is admitted, for example, paging is admitted only if the source address of downlink data belongs to the range; or explicitly pointing out whether each service flow admits paging or not. No limitation is made on which service flows are set as admitting paging, but it can be flexibly set as required, for example, the downlink initial service flow of each MS without a classifier can be set as not admitting paging, although it may not be processed in this way in practical applications.

The AAA or strategy server can obtain information of each service flow, including type and ID of the service flow, of each MS from the CSN. Method for this is the same with the prior art.

Step 202: the ASN stores the service flow paging strategy of the MS, and an Anchor SFA in the ASN can be used to store the service flow paging strategy of the MS.

Embodiment 2

Figure 3:
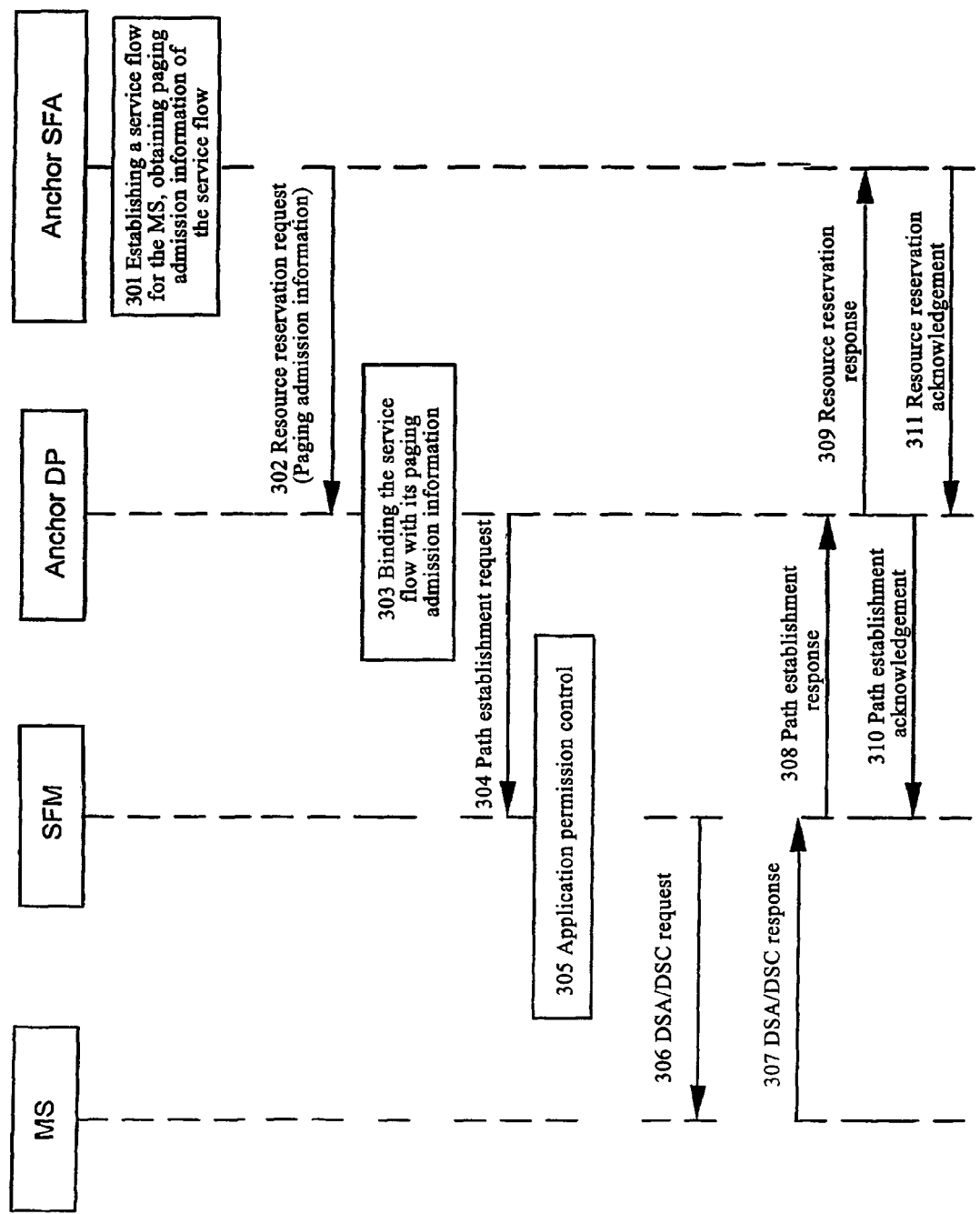
FIG. 3 is a schematic diagram illustrating a flow of establishing a service flow according to an embodiment of the present invention.

Establishing a Service Flow, of Which Specific Steps are Shown in FIG. 3

Figures 1, 2:
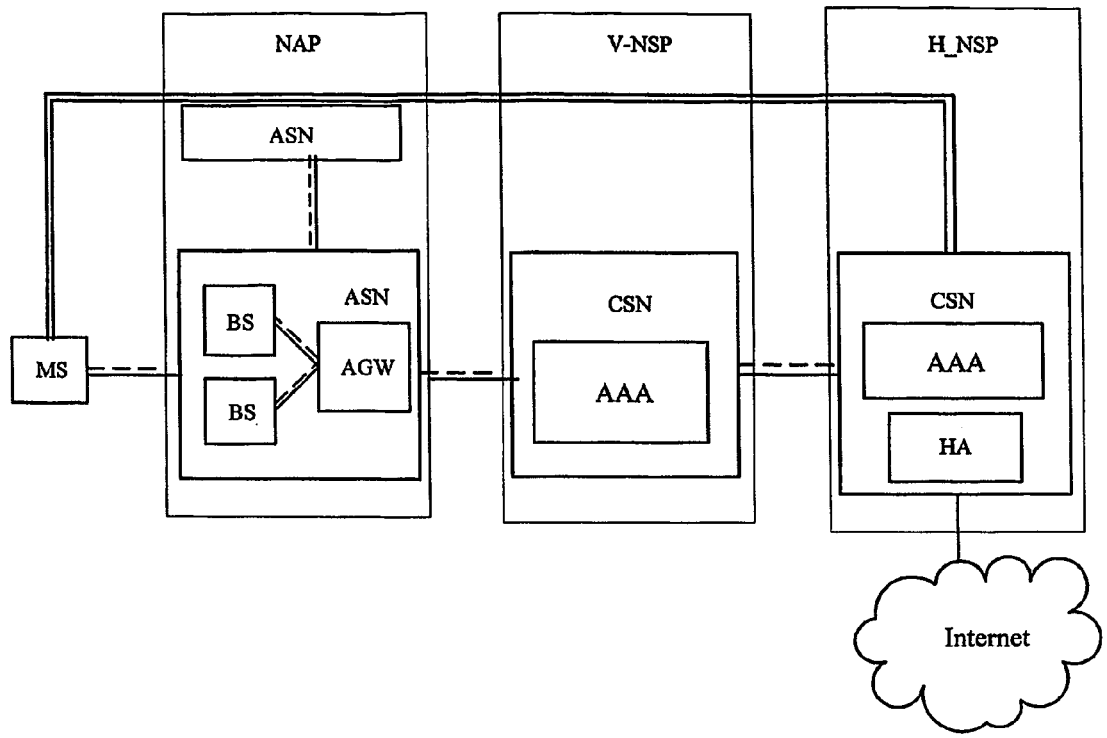
FIG. 1 is a schematic diagram illustrating a basic structure of a Wimax network in the prior art.
FIG. 2 is a schematic diagram illustrating paging admission information represented by a TLV field according to an embodiment of the present invention.

Step 301: a service flow is established for an MS, and an Anchor SFA searches for the stored service flow paging strategy according to the ID of the service flow to obtain paging admission information of the service flow, the paging admission information indicating whether the service flow admits paging or not;

Step 302: the Anchor SFA sends resource reservation request SF Info to a Serving SFA, i.e., an Anchor DP (Anchor Data Path) to trigger a flow of establishing a service flow path, wherein the paging admission information of the service flow is carried;

Paging admission information of a service flow can be carried by, but not limited to, a TLV (Type Length Value) field, wherein the Type is information about a label and encoding format, used to indicate the service type of the transmitted content; the TLV field representing the paging admission information of a service flow can be a newly added field in the resource reservation request, or obtained by amending an original definition of a TLV in the resource reservation request, so that it is used to represent paging admission information of a service flow. The method for representing paging admission information by the TLV field is shown in FIG. 2, wherein TYPE=TBD, Length=2, and Value=Paging Admission Indicator representing whether paging is admitted or not; 0x0000 is used to represent not admitting paging, and 0x0001 is used to represent admitting paging;

Step 303: after receiving the resource reservation request, the Anchor DP binds the service flow with its paging admission information, the service flow bound with the paging admission information is uniquely determined by identification of the MS, to which the service flow belongs, in conjunction with the ID of the service flow, and a flow of establishing a service flow path is triggered;

Step 304: the Anchor DP initiates a request for establishing a service flow path to a Serving SFM (Service Flow Manage, situated within an ASN), and the flow of establishing a service flow path is started;

Step 305: the Serving SFM performs application permission control;

Step 306: the Serving SFM sends a DSA (Dynamic Stability Assistant system)/DSC (Dynamic Stability Control system) request to the MS;

Step 307: the MS returns a DSA/DSC response to the Serving SFM;

Step 308: the Serving SFM returns a path establishment response to the Serving SFA;

Step 309: the Serving SFA returns a resource reservation response to the Anchor SFA;

Step 310: the Serving SFA sends a path establishment acknowledgement to the Serving SFM;

Step 311: the Anchor SFA sends a resource reservation acknowledgement to the Serving SFA.

In the step 302, if the Anchor SFA and the Serving SFA (i.e., Anchor DP) are deployed in the same network element, the resource reservation request does not need to be transmitted between network elements, therefore "the Anchor SFA sends resource reservation request SF Info to a Serving SFA, i.e., an Anchor DP" can be omitted or can be implemented with an internal message.

Embodiment 3

Figure 4:
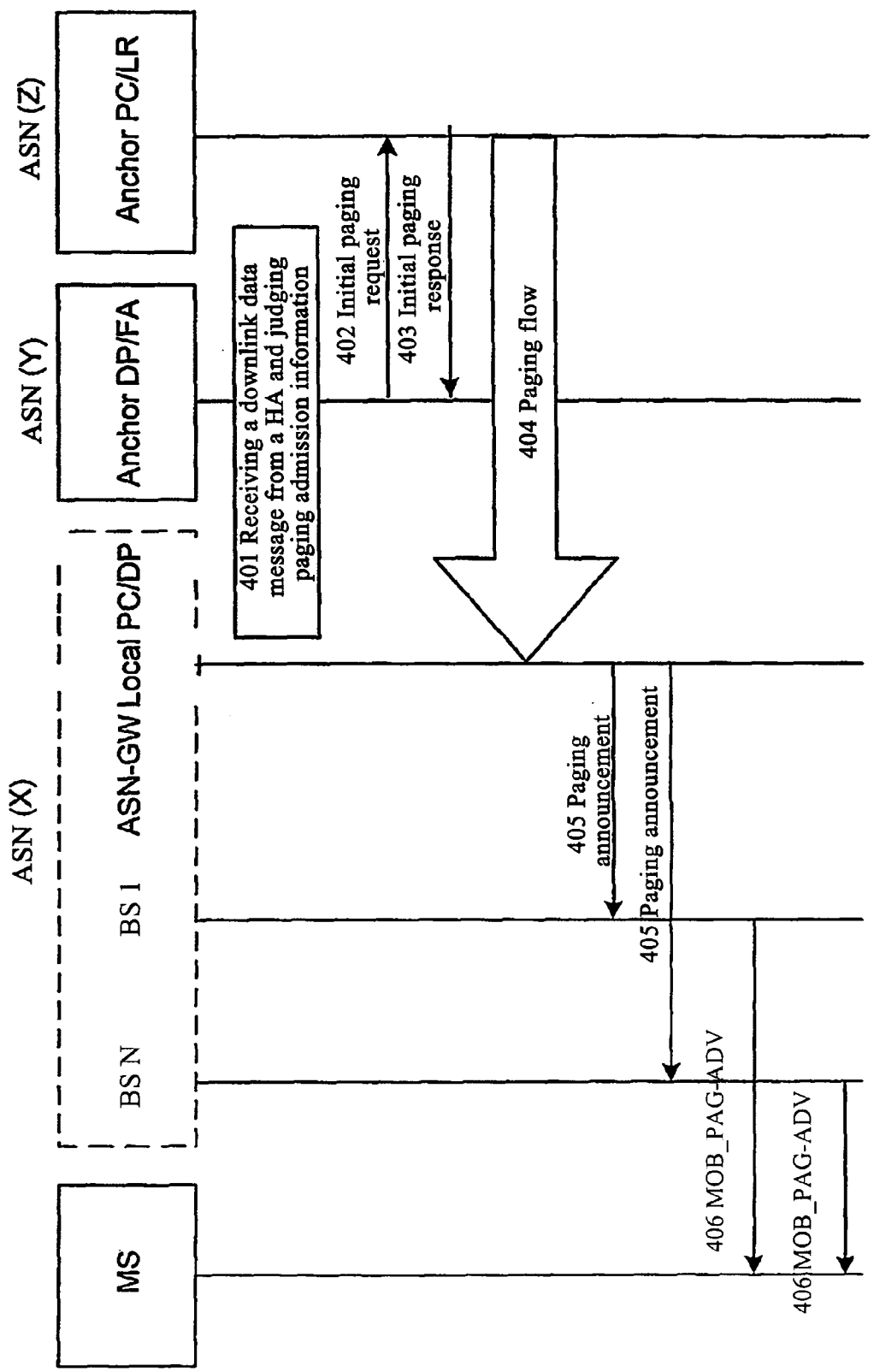
FIG. 4 is a schematic diagram illustrating a flow of receiving downlink data for paging according to an embodiment of the present invention.

Receiving Downlink Data for Paging, of Which Specific Steps are Shown in FIG. 4

Step 401: an Anchor DP situated in an AGW of an ASN receives downlink data of an MS in IDLE state from an HA, finds the downlink service flow to which the downlink data belong by searching a classifier, and obtains paging admission information of the service flow, then judges whether the paging admission information is admitting paging, if yes, proceeds step 402, otherwise, discards the downlink data;

In this step, finding the downlink service flow to which the downlink data belong by searching a classifier comprises: finding the MS to which the downlink data belong according to the IP address of the downlink data, then finding in the MS the service flow of the same service type as the downlink data, and then finding the paging admission information bound with the service flow by using the ID of the MS, to which the service flow belongs, in conjunction with the ID of the service flow.

Step 402: the Anchor DP/FA sends an initial paging request to an Anchor PC/LR;

Step 403: the Anchor PC/LR returns an initial paging response to the Anchor DP/FA;

Step 404: the ASN instructs an ASN_GW Local PC/DP to start a paging flow;

Step 405: the ASN_GW Local PC/DP sends a paging announcement to BSs (1~N);

Step 406: the BSs (1~N) send a MOB_PAG-ADV to the MS.

In the step 401, if an MS corresponding to the downlink data received by the Anchor DP does not have a service flow that matches with the downlink data in service type, paging of the MS will not be initiated even if a downlink initial service flow without a classifier in the MS is taken as the service flow to which the downlink data belong, because the downlink initial service flow without a classifier does not admit paging.

In this way, although the Anchor DP receives all the downlink data of the MSs in IDLE state from the HA and finds the MS to which each set of downlink data belong by searching a classifier, paging of the MS will not be initiated if the MS does not have a service type that matches with the downlink data, thus effectively avoiding initiating paging of all the MSs in IDLE state.

Of course, the present invention can also have various other embodiments, and without departing from the spirit and essence of the present invention, a person skilled in the art can make various corresponding modifications and variations in accordance with the present invention, and those corresponding modifications and variations shall all fall into the protection scope of the claims appended hereto.

INDUSTRIAL APPLICABILITY

Application of the technical solution of the present invention can avoid initiating paging of all the MSs in IDLE state after an Anchor DP receives downlink data belonging to IDLE state from an HA, thus alleviating resource burden of the operator and users.

What we claim is:

1. A method for paging admission control for multi-service flows in a mobile packet domain, comprising:
when authentication of a mobile station accessing a connectivity service network through an access service network succeeds, assigning a service flow paging strategy for a downlink service flow of the mobile station, wherein the service flow paging strategy includes paging admission information indicating whether the downlink service flow admits paging or not, and sending the service flow paging strategy to the access service network; and
receiving, by the access service network, downlink data of a mobile station in IDLE state from a home agent, searching for the downlink service flow to which the downlink data belong, and determining whether the downlink service flow admits paging according to the service flow paging strategy assigned for the downlink service flow, and if yes, initiating a paging flow triggered by the downlink data.

2. The method of claim 1, wherein the method specifically comprises:

when authentication of the mobile station accessing the connectivity service network through the access service network succeeds, assigning, by an authentication authorization accounting or strategy server, the service flow paging strategy for all downlink service flows of the mobile station, and sending the service flow paging strategy to the access service network for storage;

when establishing the downlink service flows, utilizing, by an anchor service flow authorization functional entity situated in the access service network, the service flow paging strategy to obtain paging admission information of each of the downlink service flows, and binding, by a serving service flow authorization functional entity, the downlink service flow with the paging admission information thereof; and after receiving, by an anchor data path situated in the access service network, downlink data of the mobile station in IDLE state from the home agent, searching for the downlink service flow to which the downlink data belong, and determining whether the downlink service flow admits paging according to the paging admission information, and if yes, initiating the paging flow triggered by the downlink data.

3. The method of claim 2, wherein, after the access service network receives the service flow paging strategy, the service flow paging strategy is stored by the anchor service flow authorization functional entity.

4. The method of claim 2, wherein the process of establishing the downlink service flows further comprises:

A, when establishing a downlink service flow for the mobile station, searching, by the anchor service flow authorization functional entity, for the service flow paging strategy of the mobile station according to an identification of the downlink service flow to obtain paging admission information of the downlink service flow, the paging admission information indicating whether the downlink service flow admits paging or not; and B, sending, by the anchor service flow authorization functional entity, a resource reservation request to the anchor data path to trigger a flow of establishing a downlink service flow path, wherein the paging admission information of the downlink service flow is carried in the resource reservation request, and binding, by the anchor data path, the downlink service flow with the paging admission information thereof after receiving the resource reservation request.

5. The method of claim 4, further comprising:

in the step B, adding a new field of Type Length Value in the resource reservation request, or amending an original definition of a Type Length Value field in the resource reservation request, in order that the Type Length Value field is used to represent the paging admission information of the downlink service flow.

6. The method of claim 4, wherein, in the step B, the downlink service flow bound with the paging admission information is uniquely determined by an identification of the mobile station, to which the downlink service flow belongs, in conjunction with the identification of the downlink service flow.

7. The method of claim 6, wherein, after receiving the downlink data of the mobile station in IDLE state from the home agent, the anchor data path situated in the access service network finds the downlink service flow to which the downlink data belong through searching a classifier, and then finds the paging admission information bound with the downlink service flow by using the identification of the mobile station, to which the downlink service flow belongs, in conjunction with the identification of the service flow.

8. The method of claim 4, wherein, if the anchor service flow authorization functional entity and the anchor data path are deployed in one network element, the resource reservation request is represented by an internal message, or sending of the resource reservation request is omitted.

9. The method of claim 2, wherein, after receiving the downlink data of the mobile station in IDLE state from the home agent, the anchor data path situated in the access service network finds the downlink service flow to which the downlink data belong through searching a classifier, and then finds the paging admission information bound with the downlink service flow by using an identification of the mobile station, to which the downlink service flow belongs, in conjunction with an identification of the downlink service flow.

10. The method of claim 2, wherein the service flow paging strategy adopts any one of the following approaches:

specifying a range of IP addresses in which paging is admitted; or explicitly pointing out whether each service flow admits paging or not.

11. The method of claim 1, wherein the service flow paging strategy adopts any one of the following approaches:

specifying a range of IP addresses in which paging is admitted; or explicitly pointing out whether each service flow admits paging or not.

* * * * *